Oct. 5, 1954            A. ETIENNE            2,690,655

PROCESS FOR LIQUEFACTION AND SEPARATION OF GASES

Filed July 19, 1949                         3 Sheets-Sheet 1

INVENTOR
ALFRED ETIENNE.
By Young, Emery & Thompson
Attys.

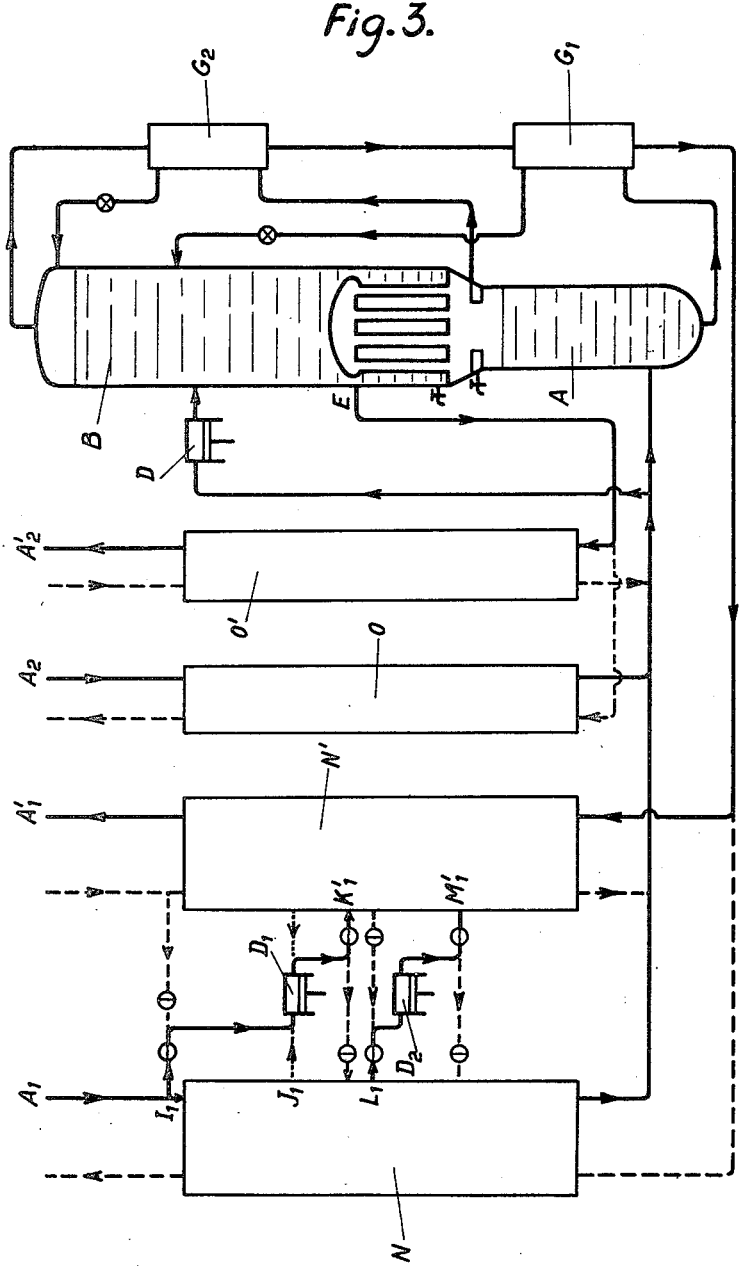

Patented Oct. 5, 1954

2,690,655

UNITED STATES PATENT OFFICE 2,690,655

PROCESS FOR LIQUEFACTION AND SEPARATION OF GASES

Alfred Etienne, Paris, France, assignor to L'Air Liquide, Societe Anonyme pour l'Etude et l'Exploitation des Procedes Georges Claude, Paris, France Application July 19, 1949, Serial No. 105,606

Claims priority, application France July 24, 1948

3 Claims. (Cl. 62—175.5)

My invention relates to improvements in methods for liquefaction and separation of the gases, in which the compressed gas to be treated exchanges its heat with the gas produced at low temperature and is then expanded at low temperature with the production of external work. The apparatuses, in which use is made of these methods, for instance the apparatuses for separation of air, produce generally units of cold required for their operation by expansion in a piston machine or in a turbine working close to the temperature for liquefaction. This expansion has to cover the cooling losses of all the equipment from the surrounding temperature up to the exhaust temperature of the expansion machine.

According to my invention, the required units of cold are produced in the area of the heat exchange no longer by the expansion mentioned above, but by a second expansion at higher temperature, effected likewise with production of external work, by gas taken substantially at the surrounding temperature, for instance by the gas to be treated before its inlet into the exchanger, or by the gas preheated in this exchanger and at the outlet from the latter, the cold thus produced being conveyed directly or indirectly to the exchanger over its whole length or anyhow over its warm portion. Under these conditions, the cold is produced in an economic manner, that required for what is possibly lacking in it for the exchange and in any case that required at temperature less than the lower temperature of the exchange operations, is supplied by the expansion at lower temperature. In this way it is possible to produce in an economic way, with an apparatus separating the air into oxygen and nitrogen gases, a small amount of liquid oxygen, for instance 10% of the oxygen produced, and even to cut out every apparatus for liquefaction of gas under high pressure that is as a rule requisite for the air separating plants.

When the gas to be treated contains water vapour, it is taken preferably not at the surrounding temperature, but after the greater portion of the water has settled in the exchanger.

Use may be made of my invention with counter-current heat exchangers, that operate continuously, in a compartment from which the gas flows in a steady manner, when the other gas, that has to exchange its heat, flows in an opposite direction into the other compartment and this takes place likewise in a continuous manner. Use may be made also of it in cases where the exchange of heat occurs in reversing alternating regenerators or in reversing counter flow heat exchangers, all machines in which the gases ensuing from the treatment through cooling flow into areas that have been traversed in a previous stage by the treated compressed gases. The name "exchanger" of which use is made applies here, unless pointed out otherwise, to all these three types of machines.

It is well known that in the case of use of these two last types of machines, for instance with air taken solely as an example, the previous decarbonation of the latter becomes of no use: the incoming air gives up its carbon dioxide content in the regenerators as a result of the cooling to which it is subjected, and this carbon dioxide is then sublimated when the regenerator is traversed by gases in greater amount than the air that has flowed into the regenerators, for instance by cooled gases leaving the separating column. In the latter case, the present invention enables use to be made, as gas for the second expansion, for that conducted "in the warm state," the other expansion being carried out "in the cold," of a gas containing this impurity, for instance the gas that has circulated in the regenerator for the evaporation there of this impurity; but then, the expansion of the gas is regulated so that the end temperature of the latter is above the temperature at which this impurity settles out, the expanded gas being sent into the portion of the regenerator that is likewise at a temperature that is above the temperature at which this impurity settles out. A valve device provides means for sending into the expansion machine, that operates in a continuous manner, the gas being considered leaving alternately each of the two regenerators. In such a case, and with the exception of what will be stated later on, it is the cold expansion that supplies the complementary cold required for the exchanger and for the remainder of the plant.

In the same way, if the gas for the warm expansion is the gas to be treated, taken in the neighbourhood of the surrounding temperature, this gas, after its warm expansion, is sent alternately through a set of suitable valves into that one of the regenerators that is, at this instant, traversed by the cold gases.

In each of the two cases mentioned above, the gas under consideration may, as in the case for air, contain an impurity, water vapour in the case of air, less volatile than the impurity such as carbon dioxide that has been mentioned. Since the amount of this gas employed for warm expansion is slight in relation to the total amount of gas treated, for instance in the nature of 3% of the air treated, this water vapour is not troublesome, as a rule, since the gas is compressed at high pressure, for instance at 100 atmospheres for the air and the amount of water vapour remaining in this air thus compressed is slight, so that no necessity arises of providing for the drying of the latter.

The sole drawback then lies in the fact that the circuit where the air flows and where the water vapor is settled out, will become partly choked, but this takes place at the end of a comparatively lengthy period; this drying may be provided also through physical means, such as alumina gel or through refrigerating means, such as an exchanger in which the gas is cooled while settling out its moisture, then returns in an opposite direction to be reheated by the incoming gas.

In the case where the warm expansion mentioned above does not supply, for instance as the result of the existence of a comparatively not very volatile impurity that has been remarked on above, or as a consequence of an insufficiently high pressure, the drop in temperature required for sending back the expanded gas into the area of the lowest temperature of the exchanger, an addition is made to the above-mentioned warm expansion supplying an intermediate temperature of one or more other expansions with production of external work operated in a similar way, but less warm and less and less warm from one to the other. The cold expansion supplies then the units of cold required at temperatures lower than the lowest temperature of the exchanger. As a gas for this or these less warmed expansions, use is made of any gas, but preferably the same gas as that employed for the warm expansion, for instance a portion of the latter, if there are no impurities present, that is taken at a temperature lower than the intermediate temperature supplied by the warm expansion.

In this case, while carrying on with the use of the single warm expansion mentioned above, the units of cold may be made up that is required for the exchanger and the remainder of the plant, by making use solely of the cold expansion; the latter is then worked by partly reheating in the cold portion of the exchanger a gas under pressure, by expanding it with production of external work and to a temperature below the lowest temperature of the exchanger and by sending it to the liquefaction and separation apparatus. So it is that in the case of the separation of the air, the nitrogen, leaving under about 5 atmospheres from the high pressure column of the separation apparatus, is sent to the cold end of the exchanger, then, after a certain amount of reheating, a portion is expanded (cold expansion) and joins up with the nitrogen leaving the low pressure column before the passing of this nitrogen into the coolers where it circulates in indirect contact with the two upflows of liquids from the rectifying apparatus. The remainder of the nitrogen, that has not been employed for this cold expansion, carries on traversing the exchanger and, brought to the neighbourhood of the surrounding temperature, it is expanded with external work, the expanded gas being sent back into the exchanger above the point where the first portion of the nitrogen is taken to be sent to the cold expansion machine.

Use may be made of the above-mentioned arrangement likewise in the case where, with the previous warm expansions, the lowest temperature of the exchanger has not yet been obtained.

The accompanying drawing shows diagrammatically two examples of embodiments of the present invention.

In the drawings:

Figure 3 is a view similar to Figure 1 showing a further modification of the invention.

Figure 1:
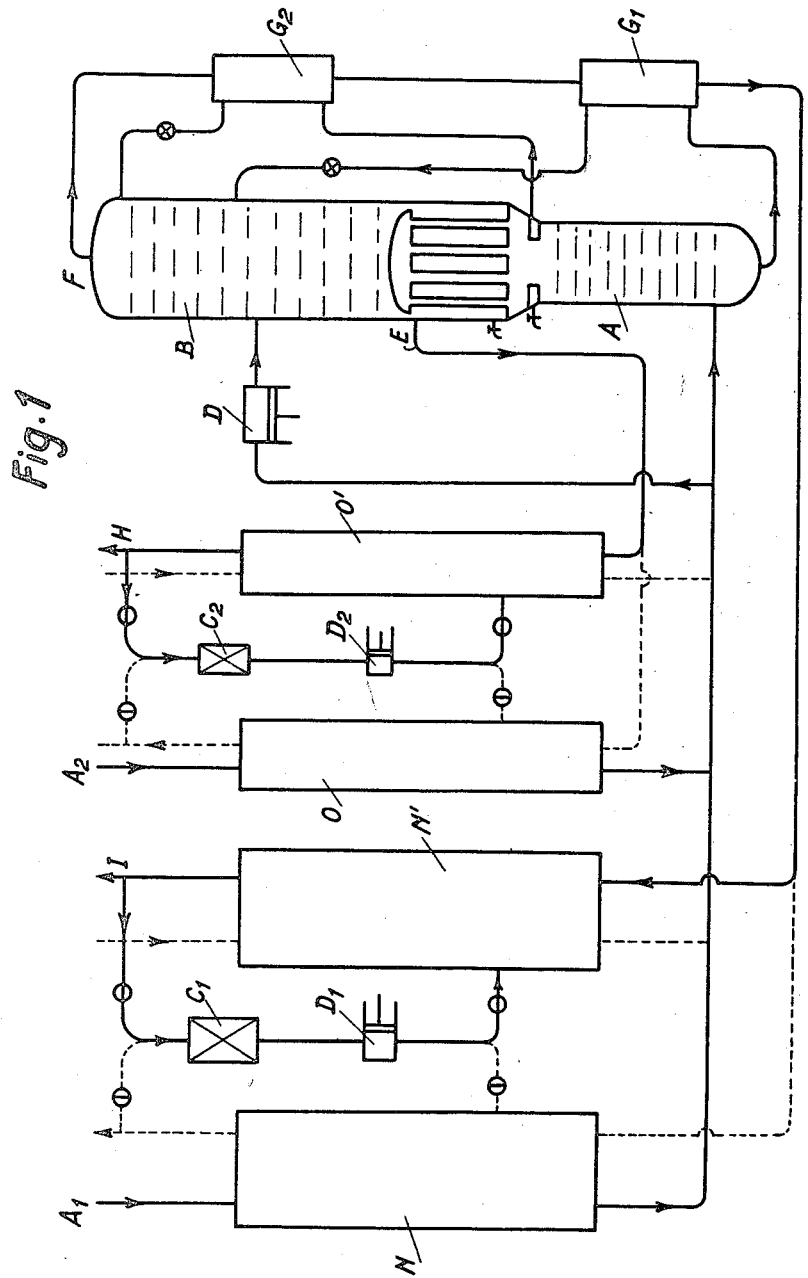
Figure 1 is a diagrammatic view of an apparatus for carrying out the process of separating a gaseous mixture according to the present invention.

Figure 1 shows an air separation apparatus with reversing alternating regenerators in which the warm expansion is operated by nitrogen and oxygen issuing from the regenerators. This figure shows the period during which the air compressed to 5-6 atmospheres for example comes by $A_1$ into the nitrogen regenerator N and by $A_2$ into the oxygen regenerator O, these two regenerators having been cooled during the foregoing period respectively by nitrogen and oxygen coming out of the rectification column. When going out of the regenerators N and O, the compressed air, cooled and freed from its carbon dioxide and its water vapour, is led to a double rectification column. A portion of the air enters into the high pressure column A where it becomes liquefied and rectified as is known, supplying a liquid enriched in oxygen and a liquid enriched in nitrogen which are led into the low pressure column B after having flowed through the coolers $G_1$, $G_2$. The portion of the compressed air which has not entered the high pressure column A is expanded with external work in the expansion machine D, then is introduced into the low pressure column B. The gaseous oxygen leaving by E the rectification apparatus is led to the regerenator $O'$ wherefrom it flows by H; the nitrogen leaving by F the rectification apparatus, goes through the coolers $G_2$ and $G_1$, and is led to the regenerator $N'$ wherefrom it flows by I. A portion of the oxygen leaving by H the regenerator $O'$ is compressed to 150 atmospheres as an example by a compressor $C_2$, then is subjected to warm expansion in an expander $D_2$ before being introduced in the regenerator $O'$ above the point at which carbon dioxide began to settle during the preceding period. Likewise a portion of the nitrogen leaving by I the regenerator $N'$ is compressed to 150 atmospheres as an example by a compressor $C_1$, then is subjected to warm expansion in an expander $D_1$ before being introduced into the regenerator $N'$ at a point above the depositing region of carbon dioxide. It is possible to produce economically by this apparatus besides gaseous oxygen and nitrogen, a little amount of liquid oxygen and possibly a little amount of liquid nitrogen.

Figure 2:
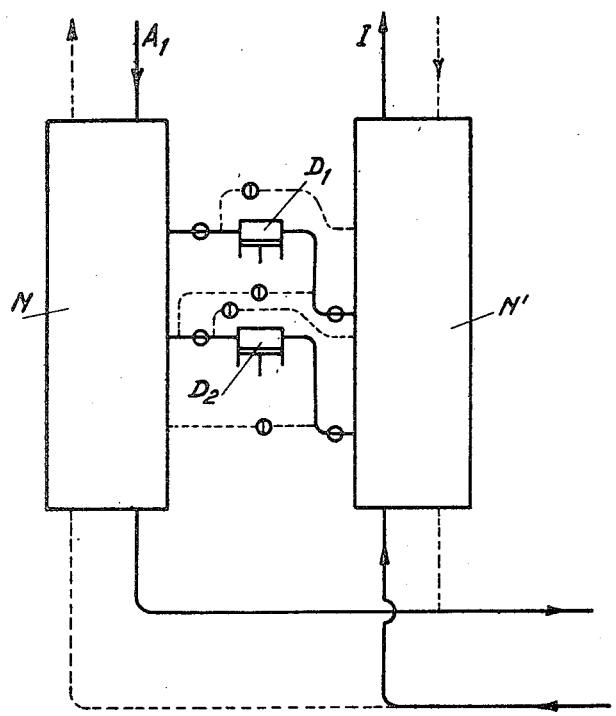
Figure 2 is a fragmentary diagrammatic view of the nitrogen regenerator portion of an apparatus for separating a gaseous mixture embodying a modification of the invention.

Figure 2 shows diagrammatically an example of two successive warm expansions. For simplification, the whole air separation apparatus is not shown, but only the two nitrogen regenerators N, $N'$ in the period during which compressed air enters by $A_1$ into the regenerator N and nitrogen issuing from the rectification column is led to the regenerator $N'$ wherefrom it flows by I. A first warm expansion takes place in the expander $D_1$ applied to a portion of air flowing through the regenerator N and taken at a place where this air is freed from its water vapour. A second expansion less warm than the first takes place in the expander $D_2$ applied to a portion of air flowing through the same regenerator N and taken at a lower place than the preceding one and above the region where carbon dioxide began to settle; the part of air expanded in $D_2$ is introduced in the regenerator N' at a place the temperature of which is lower than the temperature of the place where is introduced the part of air expanded in $D_1$.

Figure 3 shows an air separation apparatus with reversing alternating regenerators, in which a warm and a less warm expansions are performed on the set of two regenerators used for recovering the cold of the nitrogen issuing from the column. Figure 3 shows the period during which the air compressed to 5–6 atmospheres for example comes by $A_1$ into the nitrogen regenerator N and by $A_2$ into the oxygen regenerator O, these two regenerators having been cooled during the foregoing period respectively by nitrogen and oxygen coming out of the rectification column. When going out of the regenerators N and O, the compressed air, cooled and freed from its carbon dioxide and its water vapor, is led to a double rectification column. A portion of the air enters into the high pressure column A where it becomes liquefied and rectified as is known, supplying a liquid enriched in oxygen and a liquid enriched in nitrogen which are led into the low pressure column B after having flowed through the coolers $G_1$, $G_2$. The portion of the compressed air which has not entered the high pressure column A is expanded with external work in the expansion machine D, then is introduced into the low pressure column B. The gaseous oxygen leaving by E, the rectification apparatus is led to the regenerator O' wherefrom it flows by $A'_2$; the nitrogen leaving by F the rectification apparatus, goes through the coolers $G_2$ and $G_1$, and is led to the regenerator N' wherefrom it flows by I.

The warm expansion is, in this embodiment, operated as follows:

A part of the air under pressure coming into regenerator N by the duct $A_1$ is derived at $I_1$ into an expander $D_1$ wherefrom it issues in a colder condition, and enters at $K'_1$ into regenerator N' flowed through by nitrogen issuing from the separation apparatus, at a place where this nitrogen is at substantially the temperature of the air expanded in $D_1$.

The air portion which is expanded in $D_1$, instead of being taken in $I_1$, being then at the surrounding temperature, may be taken in $J_1$ through a side intake in regenerator N, being so already partly cooled, and so freed from its water vapor. It is then led to the expander through the duct figured by a dotted line.

According to another feature of the invention, above mentioned, a second expansion, less warm than the first one, is applied to another portion of the incoming air flowing through the same regenerator N and taken at $L_1$ at a place lower than the preceding one and above the region where carbon dioxide began to settle. This portion is expanded in an expander $D_2$ and led to regenerator N', wherein it enters at $M'_1$ at a place where the nitrogen flowing through N' is at substantially the temperature of the air expanded in $D_2$.

When, in a next period, the nitrogen and air flows are reversed, that is to say, when N is flowed through by nitrogen and N' by air, then the air submitted to the warm expansions is led to expanders $D_1$ and $D_2$ and therefrom to the regenerators by the ducts figured in dash-and-dot lines instead of the ones figured in full lines.

What I claim is:

1. In a process of separating a gaseous mixture wherein said gaseous mixture and a product of its separation are passed alternately along a same path through a reversing heat exchange zone in which an impurity of the mixture deposits by cooling, utilizing expansion of said gaseous mixture at low temperature, the whole of so expanded gas being submitted to the separation, the step of expanding with external work a part of the gaseous mixture containing the said impurity, the final temperature of this expansion being above the deposit temperature of this impurity, and the expanded gas being led to the portion of the heat exchange zone the temperature of which is substantially the temperature of said expanded gas.

2. In a process of separating a gaseous mixture using heat exchange and expansion with production of external work operated at low temperature, the step of expanding with external work a part of this gaseous mixture taken at substantially the surrounding temperature and sending the expanded and so cooled gas to the region of the exchange means having substantially the temperature of this expanded gas; further cooling by heat exchange the remaining gaseous mixture, expanding with external work another part of this cooled remaining mixture and then sending this so again cooled part to the region of the exchange means having substantially the temperature of the said again cooled part of the gaseous mixture.

3. In a process of separating a gaseous mixture wherein said gaseous mixture and a product of its separation are passed alternately along a same path through a reversing heat exchange zone in which an impurity of the mixture deposits by cooling, utilizing expansion of said gaseous mixture at low temperature, the step of expanding with external work a part of the gaseous mixture containing the said impurity, the final temperature of this expansion being above the deposit temperature of this impurity, and the expanded gas being led to a portion of the heat exchange zone the temperature of which is substantially the temperature of said expanded gas, further cooling by heat exchange the remaining gaseous mixture, expanding with external work another part of this cooled remaining mixture and then sending this so again cooled part to the region of the exchange means having substantially the temperature of the said again cooled part of the gaseous mixture.

References Cited in the file of this patent

UNITED STATES PATENTS

| Number | Name | Date |
|---|---|---|
| 1,539,450 | Wilkinson | May 26, 1925 |
| 1,626,345 | Le Rouge | Apr. 26, 1927 |
| 2,433,604 | Dennis | Dec. 30, 1947 |
| 2,458,894 | Collins | Jan. 11, 1949 |
| 2,496,380 | Crawford | Feb. 7, 1950 |
| 2,518,652 | Yendall | Aug. 15, 1950 |
| 2,530,602 | Dennis | Nov. 21, 1950 |
| 2,552,560 | Jenny et al. | May 15, 1951 |

OTHER REFERENCES

Chemical Engineering Progress, February 1949, pp. 129–137, Oxygen Manufacture.